United States Patent
Sherman et al.

(10) Patent No.: US 9,197,644 B1
(45) Date of Patent: Nov. 24, 2015

(54) SYSTEM AND METHOD FOR MULTITENANT MANAGEMENT OF DOMAINS

(71) Applicant: Dell Software Inc., Aliso Viejo, CA (US)

(72) Inventors: Marc Alexander Sherman, Rockville, MD (US); Marc Edward Zapf, Stone Ridge, VA (US)

(73) Assignee: Dell Software Inc., Aliso Viejo, CA (US)

( * ) Notice: Subject to any disclaimer, the term of this patent is extended or adjusted under 35 U.S.C. 154(b) by 0 days.

(21) Appl. No.: 14/169,130

(22) Filed: Jan. 30, 2014

(51) Int. Cl.
*H04L 29/06* (2006.01)

(52) U.S. Cl.
CPC ............... *H04L 63/10* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 7,185,359 B2 * | 2/2007 | Schmidt et al. | 726/2 |
| 7,953,896 B2 | 5/2011 | Ward et al. | |
| 8,255,984 B1 | 8/2012 | Ghostine et al. | |
| 8,548,998 B2 | 10/2013 | Plotnik et al. | |
| 2004/0153455 A1 * | 8/2004 | Bhogal et al. | 707/10 |
| 2007/0266082 A1 * | 11/2007 | McConnell et al. | 709/203 |
| 2011/0047206 A1 | 2/2011 | Spears | |
| 2013/0212489 A1 * | 8/2013 | Ivashin et al. | 715/753 |
| 2014/0007188 A1 * | 1/2014 | Innes | 726/2 |
| 2014/0222858 A1 * | 8/2014 | Leonard | 707/769 |
| 2014/0330948 A1 * | 11/2014 | Dunn et al. | 709/221 |

OTHER PUBLICATIONS

Citrix VDI-in-a-box 5.0, Citrix eDocs, Jan. 2012, pp. 1-37.*

Optimal IDM, "VIS Federation Services—Extending ADFS 2.0 with Multi-Repository Authentication and Additional Authentication Methods," 2012, 2 pages.

Optimal IDM, "Virtual Identity Server (VIS)—.NET LDAP Virtual Directory: Overview," 2013, 2 pages.

Optimal IDM, "Virtual Identity Server: (VIS)—The .NET LDAP Virtual Directory: Features," 2013, 2 pages.

Optimal IDM, "Virtual Identity Server for SharePoint: (VIS for SharePoint)—Providing a Secure, Manageable Multi-forest SharePoint Solution: Overview," 2013, 1 page.

Optimal IDM, "Virtual Identity Server for SharePoint: (VIS for SharePoint)—Providing a Secure, Manageable Multi-forest SharePoint Solution: Features," 2013, 3 pages.

Optimal IDM, "Virtual Identity Server (VIS)—Frequently Asked Questions," 2013, 1 page.

(Continued)

*Primary Examiner* — Benjamin Lanier
(74) *Attorney, Agent, or Firm* — Winstead PC

(57) ABSTRACT

In one embodiment, a method is performed on a multitenant shared-resources system for each managed domain of a plurality of managed domains. The method includes collecting configuration data for the managed domain via a configuration interface provided to an authorized user. The method further includes identifying domain-information sources for the managed domain based, at least in part, on the configuration data. The domain-information sources include a catalog server and an authentication server. In addition, the method includes acquiring domain information for the managed domain from at least one domain-information source of the domain-information sources. Further, the method includes enumerating users for the managed domain. The method also includes assigning at least a portion of the users to shared resources maintained by the multitenant shared-resources system. At least a portion of the plurality of domains have independent security boundaries.

19 Claims, 10 Drawing Sheets

(56) References Cited

OTHER PUBLICATIONS

Optimal IDM, "Virtual Identity Server for SharePoint: (VIS for SharePoint)—Providing a Secure, Manageable Multi-forest SharePoint Solution: Benefits," 2013, 1 page.

Optimal IDM, "Virtual Identity Server: (VIS)—The .NET LDAP Virtual Directory: Adapters," 2013, 3 pages.
Optimal IDM, "Virtual Identity Server: (VIS)—The .NET LDAP Virtual Directory: Benefits," 2013, 2 pages.

* cited by examiner

SYSTEM AND METHOD FOR MULTITENANT MANAGEMENT OF DOMAINS

CROSS-REFERENCE TO RELATED APPLICATION

This patent application incorporates by reference the entire disclosure of a U.S. patent application bearing Ser. No. 14/169,136 and filed on Jan. 30, 2014.

BACKGROUND

1. Technical Field

The present invention relates generally to information management and more particularly, but not by way of limitation, to systems and methods for multitenant management of domains.

2. History of Related Art

Many companies take advantage of virtualization solutions to consolidate several specialized physical servers and workstations into fewer servers running virtual machines. Each virtual machine can be configured with its own set of virtual hardware (e.g., processor, memory, ports, and the like) such that specialized services that each of the previous physical machines performed can be run in their native operating system. In particular, a virtualization layer, or hypervisor, allocates the computing resources of one or more host servers into one or more virtual machines and further provides for isolation between such virtual machines. In such a manner, the virtual machine is a representation of a physical machine by software.

Virtualization solutions can be adapted to provide virtual desktop computing (VDC). In VDC systems, each virtual machine can represent a virtual desktop, which can be accessed remotely by a client machine. By providing virtual desktops, VDC systems can allow users to access their applications and data from any remote computing device. VDC systems also centralize and streamline desktop administration for IT administrators.

Terminal Services is a MICROSOFT WINDOWS component that provides benefits similar to the benefits of VDC systems. A machine running Terminal Services is a Terminal Server, which can act like a mainframe multi-user operating system. As such, the Terminal Server can allow multiple concurrent users to start a remote interactive Windows session. Like VDC systems, Terminal Servers centralize user application and data, allowing remote access and efficient IT administration.

Authentication to a virtual desktop or Terminal Server can be performed using single sign-on authentication. Single sign-on authentication is a technique that can reduce or eliminate credentials re-prompting each time a user accesses a computing resource, such as a virtual desktop, Terminal Server session, or application. Single sign-on authentication is not easily implemented in a multitenant setting involving, for example, multiple customers or organizations. Typical solutions can give users visibility into domains of other organizations, which can pose a security risk.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is performed on a multi-tenant shared-resources system for each managed domain of a plurality of managed domains. The method includes collecting configuration data for the managed domain via a configuration interface provided to an authorized user. The method further includes identifying domain-information sources for the managed domain based, at least in part, on the configuration data. The domain-information sources include a catalog server and an authentication server. In addition, the method includes acquiring domain information for the managed domain from at least one domain-information source of the domain-information sources. Further, the method includes enumerating users for the managed domain. The method also includes assigning at least a portion of the users to shared resources maintained by the multitenant shared-resources system. At least a portion of the plurality of domains have independent security boundaries.

In one embodiment, an information handling system includes a processing unit, wherein the processing unit is operable to implement a method. The method includes collecting configuration data for the managed domain via a configuration interface provided to an authorized user. The method further includes identifying domain-information sources for the managed domain based, at least in part, on the configuration data. The domain-information sources include a catalog server and an authentication server. In addition, the method includes acquiring domain information for the managed domain from at least one domain-information source of the domain-information sources. Further, the method includes enumerating users for the managed domain. The method also includes assigning at least a portion of the users to shared resources maintained by the information handling system. At least a portion of the plurality of domains have independent security boundaries.

In one embodiment, a computer-program product includes a non-transitory computer-usable medium having computer-readable program code embodied therein. The computer-readable program code is adapted to be executed to implement a method. The method is performed for each managed domain of a plurality of managed domains. The method includes collecting configuration data for the managed domain via a configuration interface provided to an authorized user. The method further includes identifying domain-information sources for the managed domain based, at least in part, on the configuration data. The domain-information sources include a catalog server and an authentication server. In addition, the method includes acquiring domain information for the managed domain from at least one domain-information source of the domain-information sources. Further, the method includes enumerating users for the managed domain. The method also includes assigning at least a portion of the users to shared resources maintained by a multitenant shared-resources system. At least a portion of the plurality of domains have independent security boundaries.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Figure 1:
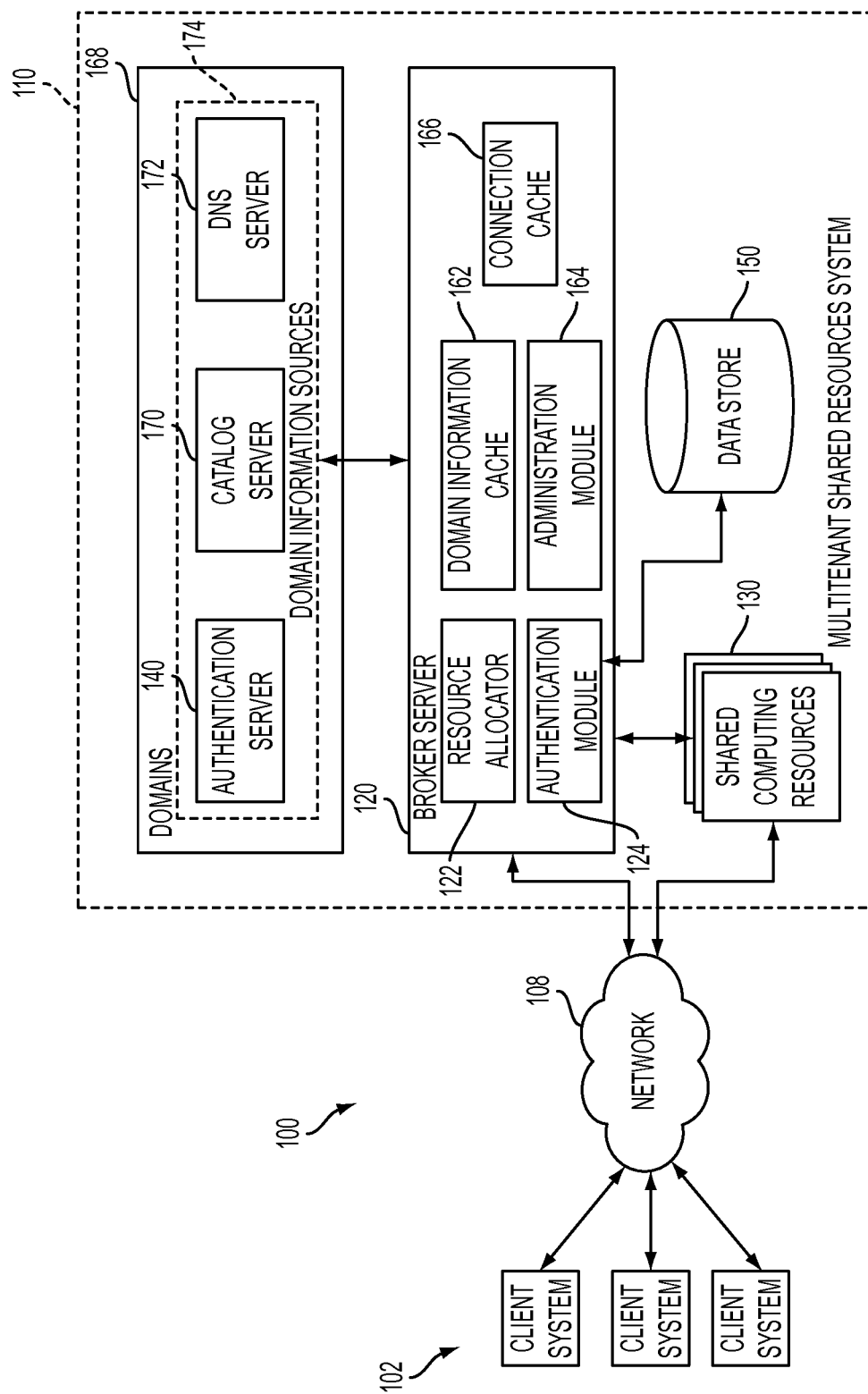
FIG. 1 illustrates an embodiment of a network environment.

In a server-based computing environment, shared resources such as virtual desktops and/or Terminal Servers can be pooled in a centralized data center. Client devices can initiate network connections with the shared resources using a remote protocol, thereby allowing these clients to establish interactive computing sessions.

Prior to establishing a connection, a client can be authenticated and provided with an authorized list of named resources. These named resources represent shared resources that the client is eligible to access. A network service, referred to as a broker, can be responsible for authenticating the client and providing it with an authorized list of named resources based at least partly on the client's identity and other network and security attributes. Upon requesting connectivity to a particular named resource, the broker can also be responsible for resolving the named resource to an actual network address that the client can use to establish a connection.

As described herein, the broker can serve a multitenant function. That is, the broker can be responsible for authenticating clients that belong to different organizations or organizational subunits. Generally, this multitenancy is manifested by the clients being associated with different domains. In addition to having its ordinary meaning, a domain as used herein refers to a collection of network objects such as computers, users, and devices that share a same directory-services database.

Depending on a directory-services framework that is utilized, domains may be subsumed within a more comprehensive management hierarchy. MICROSOFT Active Directory, for example, establishes logical divisions of forest, tree, and domain. A tree is a collection of one or more domains and domain trees in a contiguous name space, linked in a transitive trust hierarchy. A forest is a collection of trees that share a common global catalog, directory schema, logical structure, and directory configuration. Typically, the forest represents the security boundary within which users, computers, groups, and other network objects are accessible.

One way for the broker to implement the multitenant function mentioned above is to integrate all domains into a common management hierarchy. For example, in MICROSOFT Active Directory implementations, this can be done by placing all domains within a single forest. Another option is to establish trust relationships between each distinct forest. A downside of these approaches is that a user from a particular domain may be given visibility into other domains that belong to other organizations. Another downside is that the user may be required to select their domain in order to log-in.

This disclosure describes systems and methods for allowing the broker to perform the multitenant function without modifying native security boundaries applicable to a given domain. In certain embodiments, these systems and methods can be used to enhance single sign-on (SSO) security, simplify management of shared resources, and more efficiently administer independent domains. For example, in some embodiments, a shared resources system can identify sources of domain information for a particular domain, collect the domain information, and cache the domain information for later use. Thereafter, users, groups, organizational units, and the like can be assigned to shared resources such as virtual desktops or remote applications. A managed service provider (MSP), for example, can centrally maintain multiple domains on the shared resources system while preserving the security independence of those domains. Advantageously, in certain embodiments, a client need not specify a domain when initiating a connection with one of the shared resources.

For illustrative purposes, examples may be provided herein with respect to MICROSOFT Active Directory. However, it should be appreciated that the principles described herein are not so limited. Other directory services such as, for example, NOVELL eDirectory, Red Hat Directory Server, APPLE Open Directory, Apache Directory Server, and/or the like can also be utilized.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 illustrates an embodiment of a network environment 100 for providing access to a multitenant shared-resources system 110. The multitenant shared-resources system 110 can provide access for users of client systems 102 to shared computing resources 130. These shared resources 130 can include virtual desktops, Terminal Servers, blade computers (such as blade PCs), applications, and the like. Advantageously, in certain embodiments, the multitenant shared-resources system 110 also provides secure SSO access to the resources 130.

The users of the client systems 102 can be associated with any of managed domains 168. The managed domains 168, in a typical embodiment, are representative of domains for whose users the multitenant shared-resources system 110 provides SSO access to the shared resources 130. In general, the shared resources 130 can reside in the managed domains 168 for access by authorized users. However, in some cases, the shared resources could reside in other domains, for example, that are trusted by a domain in which a broker server 120 resides. Some or all of the managed domains 168 can be associated with different organizations, different divisions within an organization, and/or the like. In some embodiments, the managed domains 168 can be domains of numerous distinct organizations administered by a MSP. As described in greater detail below, the managed domains 168 can each have domain information sources 174 with which the broker server 120 communicates. In various embodiments, the multitenant shared-resources system 110 can exist within one of the managed domains 168 or outside of the managed domains 168.

The multitenant shared-resources system 110 can be implemented by one or more information handling systems, such as servers. These information handling systems can be distributed geographically or can be co-located. The client systems 102 can include information handling systems such as, for example, desktop computers, workstations, personal digital assistants (PDAs), smart phones, other wireless handheld devices, laptop computers, tablets, and the like.

The client systems 102 can further include various software applications for accessing the multitenant shared-resources system 110, such as browser software applications, stand-alone software applications, plug-ins, interfaces, combinations of the same, and the like. The client systems 102 can access the multitenant shared-resources system 110 over a network 108, which can include a local or wide area network (LAN or WAN), such as an organization's intranet, the Internet, combinations of the same, and the like.

In the depicted embodiment, the multitenant shared-resources system 110 includes the broker server 120, the shared resources 130 described above, and a data store 150. Each of these components can be implemented in software and/or hardware. For example, in one embodiment, the broker server 120 represents an information handling system that is a physical computing device. In another embodiment, the broker server 120 represents a software service executing on an information handling system. Although the various components of the multitenant shared-resources system 110 are illustrated separately, some or all of them can be implemented together in one or more of the same information handling systems.

The broker server 120 can allow the client systems 102 to communicate with the broker server 120 to obtain access to the shared resources 130. The example broker server 120 shown includes a resource allocator 122, an authentication module 124, a domain information cache 162, an administration module 164, and a connection cache 166. The resource allocator 122 can perform load balancing in certain embodiments by allocating shared resources 130 to client systems 102 in a manner that reduces the load on any given resource 130. The authentication module 124 can provide SSO access for the client systems 102 to the shared resources 130. The features of the authentication module 124 are described in greater detail below.

In a typical embodiment, the administration module 164 is operable to interact with an appropriately credentialed user (e.g., an administrator) to configure the managed domains 168, identify the domain information sources 174, and collect domain information from the domain information sources 174. The broker server 120 can store the collected domain information in the domain information cache 162. The administration module 164 can be resident on the broker server 120 as illustrated, the client systems 102, or another information handling system. Exemplary operation of the administration module 164 will be described with respect to the ensuing FIGURES.

By way of example, for each of the managed domains 168, the domain information sources 174 are shown to include an authentication server 140, a catalog server 170, and a domain name system (DNS) server 172. It should be appreciated that, although each managed domain of the managed domains 168 can have the domain information sources 174 as illustrated, some or all of the domain information sources 174 may not be exclusive to the managed domain. For example, the DNS server 172 can serve more than one domain, including more than one of the managed domains 168. Additionally, for simplicity of illustration, the authentication server 140, the catalog server 170, and the DNS server 172 are illustrated singly. However, it should be appreciated that, in various embodiments, some or all the managed domains 168 can be associated with more than one of the authentication server 140, the catalog server 170, and/or the DNS server 172.

For a given managed domain of the managed domains 168, the DNS server 172 can resolve a domain name (e.g., dell.com) to respective network locations (e.g., IP addresses) of the authentication server 140 and the catalog server 170. The authentication server 140 can be a directory server that performs authentication for a given managed domain of the managed domains 168. For example, in one embodiment, the authentication server 140 is a MICROSOFT Active Directory server, such as a domain controller or the like. The catalog server 170 can maintain a global listing of all network objects within an applicable security boundary. Depending on implementation, the particular security boundary can be exclusive to the given managed domain or can be of a broader scope. For example, in MICROSOFT Active Directory implementations, the catalog server 170 can be a global catalog server that provides a global listing of all network objects in a given forest.

The connection cache 166 can include connection information for existing connection sessions with the domain information sources 174. In certain embodiments, the connection cache 166 can cache connections that are established using, for example, Lightweight Directory Access Protocol (LDAP). The connection cache 166 can identify each connection session by a key. The key can include unique composition of information such as, for example, a particular domain of the managed domains 168, a user name, and a password. If, for example, identification information for a desired connection session matches the key for an existing connection session in the connection cache 166, the broker server 120 can use the connection information for the existing connection session. Otherwise, if a new connection session is created, information for the new connection session (including a corresponding key) can be added to the connection cache 166.

Advantageously, in certain embodiments, such utilization of the connection cache 166 can save the computational and network expense of session connection and teardown.

In certain embodiments, the broker server 120 can also implement certain features of the broker described in U.S. Pat. No. 8,560,593 (the "'593 patent"), the disclosure of which is hereby incorporated by reference in its entirety. In certain embodiments, the broker server 120 can further implement certain features of the broker described in U.S. Pat. No. 8,255,984 (the "'984 patent"), the disclosure of which is also hereby incorporated by reference in its entirety.

As described above, the shared resources 130 can include virtual desktops, Terminal Servers, and blade computers (such as blade PCs), applications, combinations of the same, and the like. The shared resources 130 can be implemented using any of the features described in the '593 patent or the '984 patent referred to above. Further, in embodiments where the shared resources 130 include virtual desktops, the shared resources 130 can include virtual machines implemented on a hypervisor. The hypervisor can allow multiple virtual desktops having possibly different operating systems to run on a host computer at the same time.

For instance, the hypervisor can include a thin piece of software that runs directly on top of a hardware platform of a host computer and that virtualizes resources of the computer (e.g., a native or "bare-metal" hypervisor). In such embodiments, the virtual desktops can run, with their respective operating systems, on the hypervisor without the need for a host operating system. Examples of such bare-metal hypervisors can include, but are not limited to, ESX SERVER by VMware, Inc. (Palo Alto, Calif.), XEN and XENSERVER by Citrix Systems, Inc. (Fort Lauderdale, Fla.), ORACLE VM by Oracle Corporation (Redwood City, Calif.), HYPER-V by Microsoft Corporation (Redmond, Wash.), VIRTUOZZO by Parallels, Inc. (Switzerland), and the like.

In yet other embodiments, the virtual desktops can have a hosted architecture in which the hypervisor runs within a host operating system environment. In such embodiments, the hypervisor can rely on the host operating system for device support and/or physical resource management. Examples of such hosted hypervisors can include, but are not limited to, VMWARE WORKSTATION and VMWARE SERVER by VMware, Inc., VIRTUAL SERVER by Microsoft Corporation, PARALLELS WORKSTATION by Parallels, Inc., or the like.

In certain embodiments, each virtual desktop includes a guest operating system and associated applications. In such embodiments, the virtual desktop accesses the resources (e.g., privileged resources) of the host computer through the hypervisor. Many other variations in virtualization technology are possible.

As described above, the authentication module 124 of the broker server 120 can provide users with SSO access to the shared resources 130. In one embodiment, the authentication module 124 receives initial client system 102 requests to access the broker server 120. For example, a user of a client system 102 can log into the broker server 120 with credentials. Credentials can include a user name and password. As will be described in detail below, authentication information other than credentials can be used by the client system 102 in some implementations.

Advantageously, in certain embodiments, the user does not need to expressly identify an appropriate managed domain of the managed domains 168. Rather, the authentication module 124 can receive the user credentials and, based at least partly on those user credentials, determine the appropriate managed domain. Correspondingly, the authentication module 124 can also identify the authentication server 140 for that managed domain. Thereafter, the authentication module can access the authentication server 140 to determine whether the user credentials match any credentials stored by the authentication server 140. If the credentials match, the authentication module 124 can then provide the client system 102 with access to one or more of the shared resources 130 without re-prompting the user for the credentials.

One mechanism that the authentication module 124 can use to provide client systems 102 with access to shared resources 130 is to provide tickets to the client systems 102. A ticket can include any piece of data, such as metadata. A client system 102 in possession of a valid ticket received from the authentication module 124 can provide the ticket to a shared resource 130. The shared resource 130 can then send the ticket (or some other data derived therefrom) to the authentication module 124 to verify that the user of the client system 102 can access the shared resource 130. The authentication module 124 can perform this verification in some embodiments by sending the user credentials to the shared resource 130. The authentication module 124 can store user credentials and tickets in the data store 150 or in memory.

In some embodiments, the ticket provided by the authentication module 124 is a single-use ticket. The client system 102 can use this single-use ticket to connect to a single shared resource 130. A benefit of single-use tickets, in certain embodiments, is that subsequent use of the ticket by a malicious user can result in denial of access to the shared resource 130. In some embodiments, the authentication module 124 can also establish an expiration period or time to live (TTL) for the ticket, such as 30 seconds, 60 seconds, several minutes, or some other time. If a client system 102 does not attempt to connect or does not actually connect with a shared resource 130 before the ticket expires, the client system 102 can be denied access to the shared resource 130. Further, the ticket can be encrypted with a single or multi-level encryption algorithm.

Figure 2:
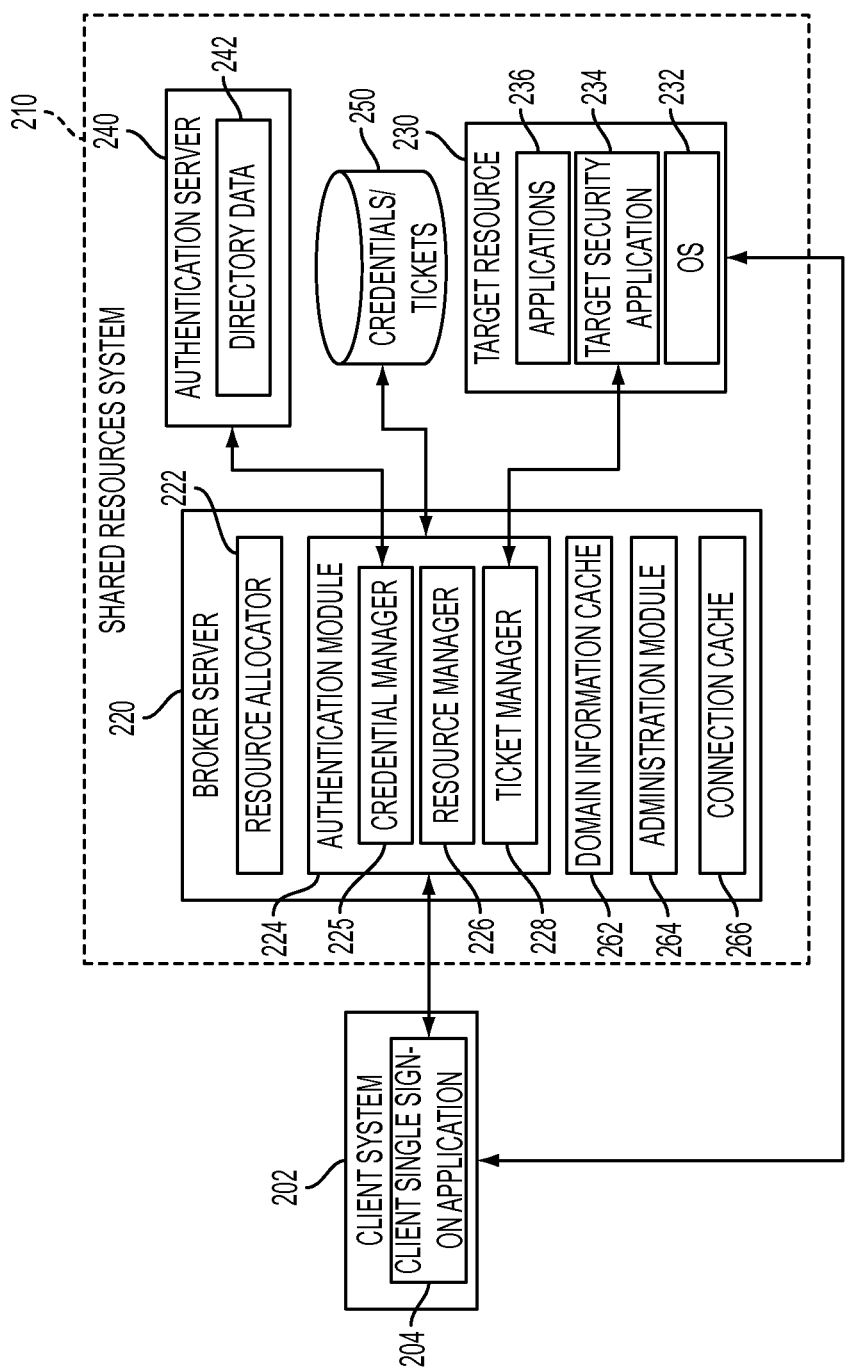
FIG. 2 illustrates an embodiment of a multitenant shared-resources system.

FIG. 2 illustrates another embodiment of the multitenant shared-resources system 110, namely the multitenant shared-resources system 210. The multitenant shared-resources system 210 can include all the features of the multitenant shared-resources system 110 described above. For instance, the multitenant shared-resources system 210 includes a broker server 220, target shared resource 230, authentication server 240, and data store 250. These components can include all the functionality described above. Additionally, a client system 202 is shown connecting with the multitenant shared-resources system 210. The client system 202 can have all the functionality described above with respect to the client system 102. For ease of illustration, the network 108 and the managed domains 168 are not depicted in the embodiment shown. However, it should be appreciated that the network 108 and the managed domains 168, although not expressly illustrated, can be present in the multitenant shared-resources system 210.

In the depicted embodiment, the client system 202 includes a client SSO application 204. This application 204 can be implemented in the hardware of the client system 202. In one embodiment, the client SSO application 204 receives user credentials from a login user interface provided by the application 204 or by an operating system of the client system 202. The SSO application 204 can provide these credentials and other attributes to the broker server 220. In one embodiment, the client SSO application 204 provides a user interface for the user to enter credentials so as to access the broker server 220. In another embodiment, the user provides credentials when logging on to the client system 202 (e.g., through an operating system prompt). The client SSO application 204 obtains these credentials from an operating system service and passes the credentials to the broker server 220.

The broker server 220, like the broker server 120, includes a resource allocator 222, an authentication module 224, a domain information cache 262, an administration module 264, and a connection cache 266. In the depicted embodiment, the authentication module 224 is shown having three modules: a credential manager 225, a resource manager 226, and a ticket manager 228. In certain embodiments, the credential manager 225 receives the credentials from the application 204 of the client system 202. The credential manager 225 can store the credentials in a security cookie or the like. In addition to having its ordinary meaning, as used herein the term "security cookie" can represent contextual information that is maintained by a server. The contextual information maintained by the broker server 220 in the security cookie can include the user's credentials, among other things. In one embodiment, the credential manager 225 stores the security cookie in the data store 250 or in a memory.

The credential manager 225 can authenticate an identity of a user of the client system 202 with an authentication server 240 using the credentials. In one embodiment, the authentication server 240 is a MICROSOFT Active Directory server, such as a domain controller or the like. The authentication server 240 can also include LDAP functionality. More generally, the authentication server 240 can be a directory server that stores directory data 242, including user credentials and other user information. In response to receiving an authentication request from the credential manager 225, the authentication server 240 can confirm to the credential manager 225 whether the user has valid credentials.

If the user has valid credentials, the resource manager 226 can select one or more shared resources that are available for access by the client system 202. The resource manager 226 can obtain information regarding which resources are available from the resource allocator 222. For example, the resource allocator 222 can apply a load balancing algorithm to determine which shared resources are available and can provide this availability information to the resource manager 226. The resource manager 226 can communicate to the client system 202 a list of one or more authorized resources that the client system 202 is permitted to access.

In response to receiving such a list, the client SSO application 204 can select a target resource (e.g., the target resource 230) to which the client system 202 would like to connect. The application 204 can communicate this request to the authentication module 224. The ticket manager 228 of the authentication module 224 can receive this request. The ticket manager 228 can create a ticket having a reference to the security cookie previously generated by the credential manager 225 in response to receiving the request. The ticket manager 228 can also store the ticket in the data store 250 or in a memory. The ticket manager 228 can provide the ticket to the application 204 of the client system 202. This ticket can enable the application 204 of the client system 202 to authenticate to the target resource 230 without storing the user credentials and connection information on the client system 202.

The target resource 230 includes, in the depicted embodiment, an operating system 232 (such as a guest operating system), a target security application 234, and other applications 236. In response to receiving a ticket from the client SSO application 204, the target security application 234 can provide the ticket to the ticket manager 228 of the broker server 220. In response, in one embodiment, the ticket manager 228 provides the user credentials stored in the data store 250 to the target security application 234.

The target resource 230 can include its own authentication mechanism, which may be provided by the operating system 232. The target security application 234 can provide the credentials to the authentication mechanism of the target resource 230 to authenticate the user. In another embodiment, the target security application 234 directly authenticates the user without using any services of the operating system 232. Once authenticated, the client system 202 can access the applications 236 of the target resource 230.

To enhance security, in certain embodiments the ticket manager 228 can destroy the ticket so that a subsequent access to the target resource 230 with the ticket does not successfully authenticate. The ticket manager 228 can destroy the ticket, for example, by deleting the ticket from the data store 250.

Figure 3:
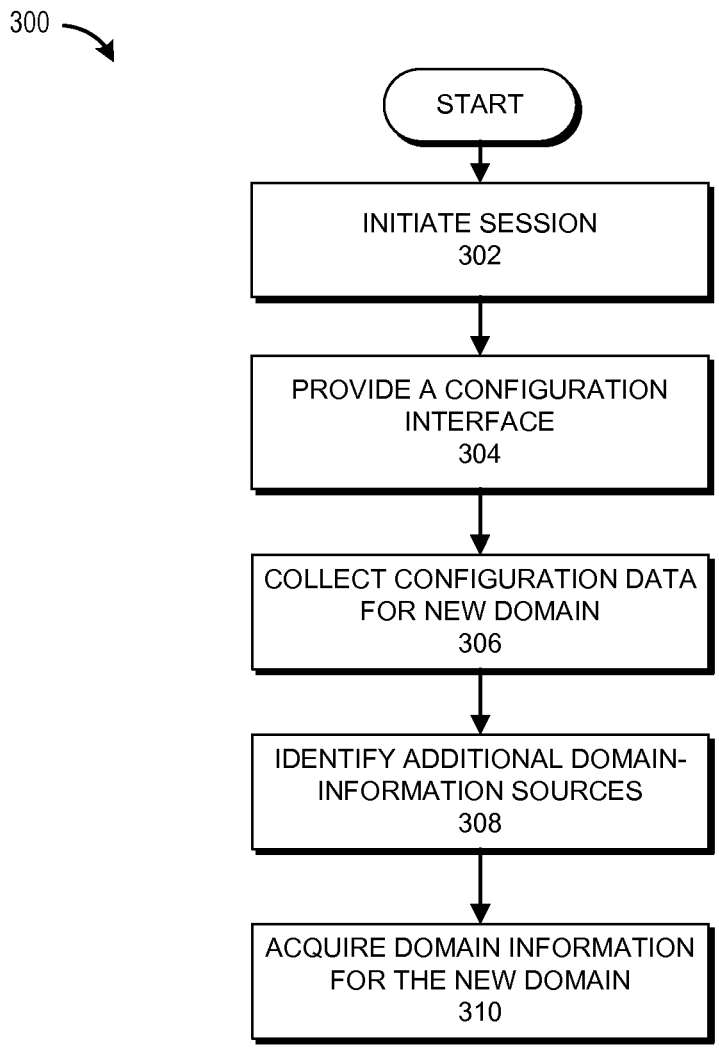
FIG. 3 illustrates an example of a process for configuring a new domain.

FIG. 3 presents a flowchart of an example of a process 300 for configuring a new domain. For example, the process 300, in whole or in part, can be implemented by one or more of the multitenant shared-resources system 110, the multitenant shared-resources system 210, and the broker server 120. Although any number of systems, in whole or in part, can implement the process 300, to simplify discussion, the process 300 will be described in relation to specific systems or subsystems of the multitenant shared-resources system 110 or 210. For simplicity of description, the process 300 is described relative to a single domain. However, it should be appreciated that the process 300 can be performed in a similar fashion with respect to multiple domains.

At block 302, the client system 102 initiates a session with an administration module such as the administration module 164 or 264. For example, in various embodiments, the administration module can receive administrative credentials from an administrative user of the client system 102. At block 304, the administration module provides a configuration interface to the client system 102. The configuration interface can be, for example, a command-line interface, a graphical user interface (GUI), etc. In general, the configuration interface enables the administrative user, or another authorized user, to provide configuration data related to the new domain.

The configuration data can include, for example, a domain short name (e.g., dell), a domain long name (e.g., dell.com), a DNS server IP address list, sufficient credentials to request additional domain information (e.g., a user name and password), and a protocol selection. The protocol selection can specify a protocol to use when communicating with the domain information sources 174. The protocol selection can specify, for example, LDAP, Secure Lightweight Directory Access Protocol (SLDAP), and/or the like.

In some cases, the administration module can provide default data for the configuration data. For example, the administration module could specify that a certain protocol, such as Lightweight Directory Access Protocol (LDAP), be used by default. In these cases, the administrative user could omit providing a protocol selection. In such cases, the default protocol selection would be utilized for all communication related to the new domain. The administration module can also allow the administrative user to deviate from the default protocol selection in a drill-down fashion. For example, if the default protocol selection were LDAP, the administrative user could specify that a different protocol (e.g., SSL or clear text) be used for the new domain or for a particular domain information source such as one of the domain information sources 174. The broker server 120 could then use the different protocol for communication related to the new domain or the particular domain information source, as appropriate. The broker server 120 could use the default protocol selection for all other communication.

At block 306, the administration module collects configuration data for the new domain. For example, the configuration data can include data entered by the administrative user via the configuration interface as described above. In certain embodiments, the configuration data can identify one or more DNS servers via, for example, a DNS IP address list as described above at the block 304.

At block 308, the administration module or another module can identify additional domain-information sources using the configuration data. For example, the administration module can connect to at least one DNS server identified by the configuration data and thereby retrieve a list of authentication servers and a list of catalog servers applicable to the new domain.

At block 310, the administration module or another module can acquire domain information for the new domain. For example, the administration module can connect to at least one authentication server identified at the block 308 using a selected protocol from the configuration data (or a default protocol selection). In some cases, the domain information can include information related to all domains within a same security boundary as the new domain. For example, in implementations using MICROSOFT Active Directory, the domain information can include forest information that describes a forest to which the new domain belongs. According to this example, the forest information could include, for example, a flatname (e.g., NetBIOS name), a root domain naming context, a configuration naming context, user principal name (UPN) suffixes, and/or the like that are applicable to the forest. Continuing this example, for each domain of the forest, the forest information could further include a distinguished name, a NetBIOS name, DNS roots, and/or the like that are applicable to the domain.

In certain embodiments, the broker server 120 can increase efficiency at the block 310 by leveraging the connection cache 166. As described above with respect to FIG. 1, the connection cache 166 can include connection information for existing connection sessions with the domain information sources 174. The connection cache 166 can identify each connection session by a key. The key can include unique composition of information such as, for example, a domain, a user name, and a password. If, for example, identification information for a desired connection session matches the key for an existing connection session in the connection cache 166, the broker server 120 can use the connection information for the existing connection session. Advantageously, in certain embodiments, such utilization of the connection cache 166 can save the computation and network expense of session connection and teardown. After block 310, the process 300 ends.

Figure 4:
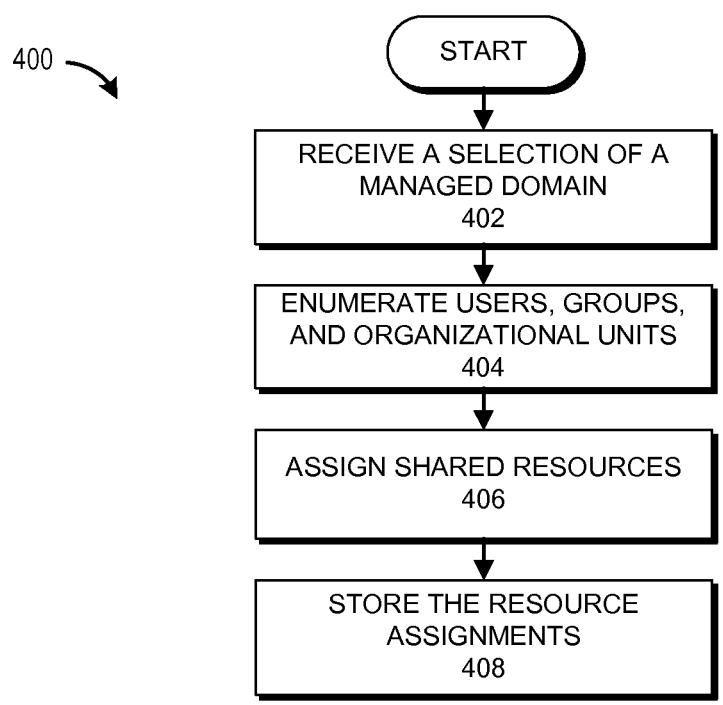
FIG. 4 illustrates an example of a process for assigning network objects to shared resources.

FIG. 4 presents a flowchart of an example of a process 400 for assigning network objects to shared resources such as virtual desktops. For example, the process 400, in whole or in part, can be implemented by one or more of the multitenant shared-resources system 110, the multitenant shared-resources system 210, and the broker server 120. Although any number of systems, in whole or in part, can implement the process 300, to simplify discussion, the process 400 will be described in relation to specific systems or subsystems of the multitenant shared-resources system 110 or 210.

At block 402, the administration module receives a selection of a domain of the managed domains 168. At block 404, the administration module enumerates users, groups, and organizational units for the selected domain. At block 406, the administration module assigns all or a portion of the users, groups, and organizational units to the shared resources 130 responsive to input from the administrative user. At block 408, the administration module stores the assignments in a data store such as the data store 150 or memory.

Figure 5:
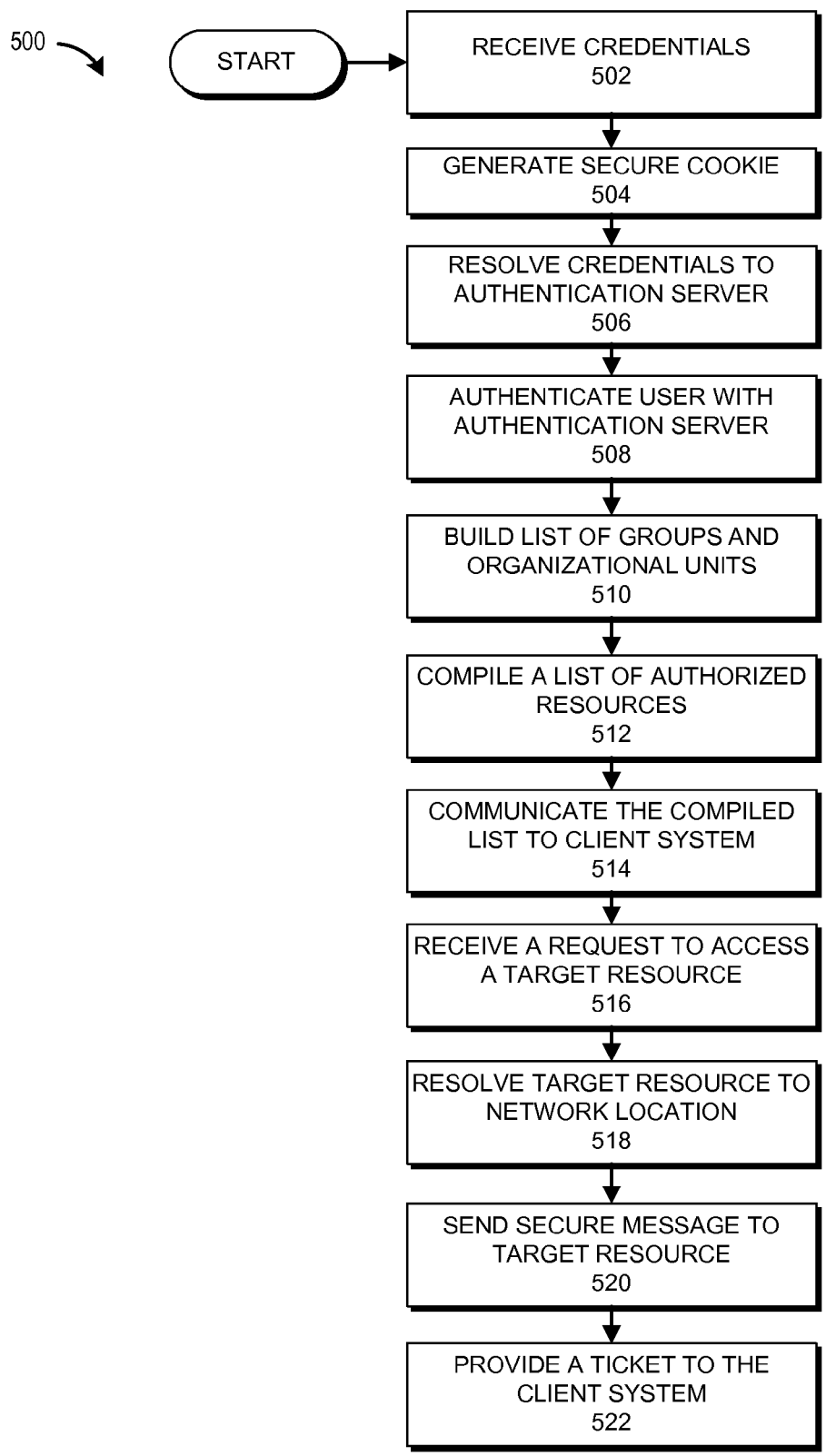
FIG. 5 illustrates an example of a multitenant broker authentication process.
Figure 6:
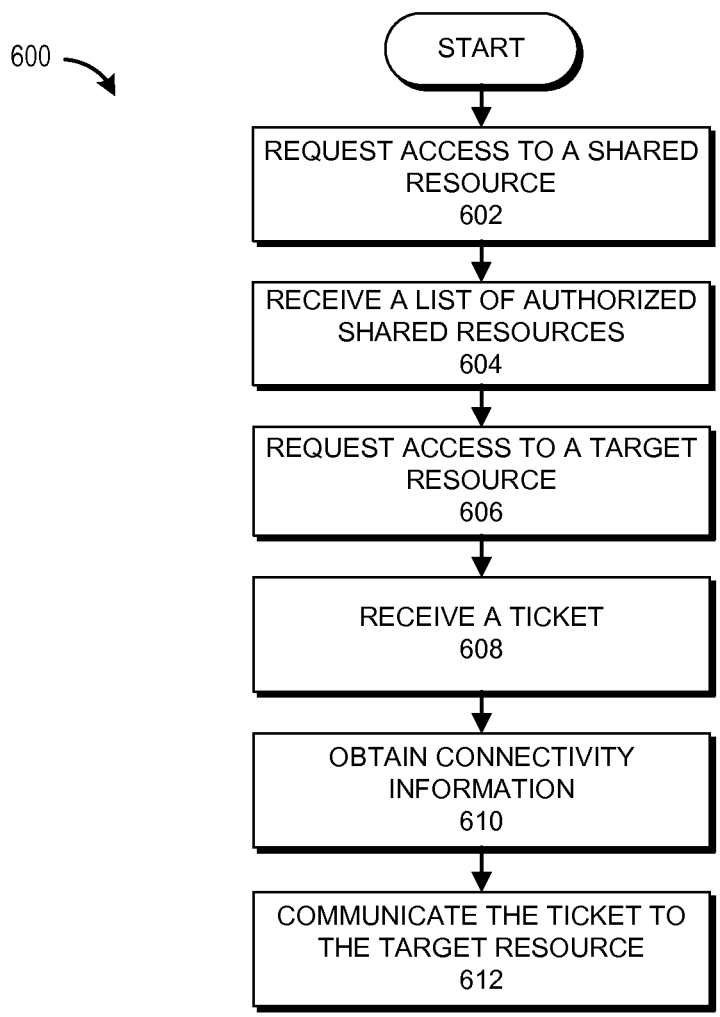
FIG. 6 illustrates an embodiment of a client authentication process for providing single sign-on access to shared resources.
Figure 7:
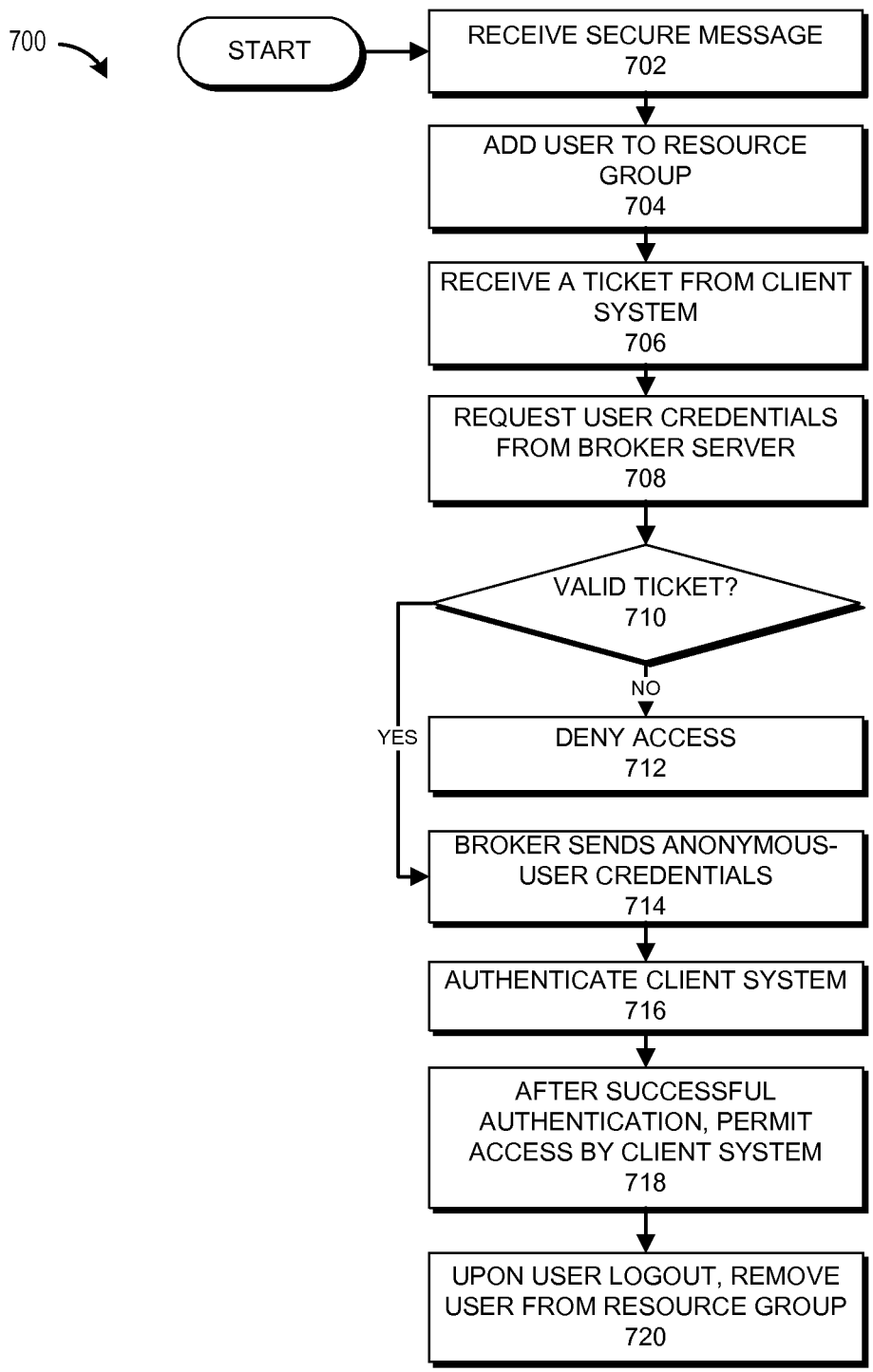
FIG. 7 illustrates an example of a target resource/broker authentication process for providing single sign-on access to shared resources.

Turning to FIGS. 5 through 8, various embodiments of authentication processes are illustrated. In particular, FIG. 5 illustrates an authentication process 500 from the perspective of a broker server, FIG. 6 illustrates an authentication process 600 from the perspective of a client system, and FIG. 7 illustrates an authentication process 700 primarily from the perspective of a target resource.

Referring specifically to FIG. 5, an embodiment of a multitenant broker authentication process 500 is illustrated for providing single sign-on access to shared resources. The multitenant broker authentication process 500 can be implemented by the shared resources system 110 or 210. For example, the multitenant broker authentication process 500 can be implemented by the authentication module 124 or 224.

At block 502, credentials are received from a client system of a user. A security cookie is generated at block 504, which stores the credentials. At block 506, the credentials are resolved to an authentication server associated with a domain of the user. An example of functionality that can be performed at the block 506 will be described with respect to FIGS. 8A-8B. At block 508, using the credentials, an identity of the user is authenticated with the authentication server identified at block 506. The authentication server can be similar, for example, to the authentication server 140 or 240. If the user identity is authenticated at block 508, a list of groups and organizational units to which the user belongs is built at block 510. The list of groups and users can be cached, for example, in memory of the broker server 120.

At block 512, the list of groups and users can be used to compile a list of authorized resources to which the user has access. For example, the list can be a list of virtual desktops that were assigned using a process similar to the process 400 of FIG. 4. At block 514, the list of authorized resources is communicated to the client system. This list can be communicated to the client system by the resource manager 226.

At block 516, a request is received from the client system to access a target resource of the authorized resources. At block 518, the target resource is resolved to a network location (e.g., an IP address) using, for example, a DNS server associated with the user's domain. The DNS server can be similar, for example, to the DNS server 172. At block 520, a secure message is sent to the target resource to add the user to a resource group for that target resource. For example, in embodiments in which the target resource is a virtual desktop, the user can be added to a remote desktop group for that virtual desktop. In various embodiments, the secure message can be encrypted.

A ticket is provided to the client system at block 522. The ticket identifies the security cookie to the client system. For example, in one embodiment, the security cookie is assigned a global unique identifier by the broker server 120 or 220. The ticket can include this global unique identifier as a reference to identify the security cookie. This identification information can enable the client system to authenticate to the target resource.

FIG. 6 illustrates an embodiment of a client authentication process 600 for providing single sign-on access to shared resources. The client authentication process 600 can be implemented by the shared resources system 110 or 210. In particular, the client authentication process 600 can be accomplished by the client SSO application 204.

At block 602, access is requested to a shared resource from a broker server. The access request may or may not specify a particular shared resource. The access request can include a submission of credentials. A list of authorized shared resources is received from the broker at block 604, for example, if the broker authenticates the credentials as described above.

At block 606, access is further requested to a target resource of the authorized shared resources. The client system can select this target from the list of named resources. A ticket is received from the broker at block 608. The ticket contains an authentication file identifier. This identifier can refer to a security cookie generated by the broker server (see FIG. 5).

A launch file is used to initiate a connection with the broker server at block 610 to obtain connectivity information for the target resource. The client system can create the launch file by storing the ticket in computer storage. The connection initiated with the broker server can be a secure connection in certain embodiments. At block 612, in response to receiving the connectivity information from the broker, the ticket is communicated to the target resource to obtain access to the target resource. In one embodiment, upon submitting the ticket, the client can receive access to the target resource. However, the target resource can perform additional authentication steps, as described below with respect to FIG. 7.

FIG. 7 illustrates an embodiment of a target resource/broker authentication process 700 for providing single sign-on access to shared resources. The authentication process 700 can be implemented by the shared resources system 110 or 210. In particular, the authentication process 700 can be accomplished by the target security application 234 and the ticket manager 228.

At block 702, a target resource receives, from a broker server, a secure message with instructions to add a user to a resource group of the target resource (see block 520 of FIG. 5). For example, if the target resource is a virtual desktop, the instructions could be to add the user to a remote desktop group of that virtual desktop. The target resource adds the user to the resource group at block 704. At block 706, the target resource receives a ticket (including, e.g., an authentication file identifier) from a client system. In response, at block 708, the target resource sends the ticket to the broker server and requests user credentials stored in the security cookie (see FIG. 5).

It is determined at block 710 whether the ticket is valid. In one embodiment, the broker server can determine validity of the ticket by checking for a corresponding ticket in the data store 150 or 250. In one embodiment, the target resource itself can perform this checking. Determining whether the ticket is valid can include determining whether the ticket is expired. A ticket can expire in certain embodiments due to a time limit being exceeded or due to the ticket being used previously to authenticate to a target resource.

If the ticket is not valid, the broker and/or target resource can deny access to the target resource at block 712. The client system therefore cannot access the target resource at block 712. Otherwise, the broker sends user credentials to the target resource at block 714. The target resource uses the credentials to authenticate the client system at block 716. At block 718, after successful authentication at block 716, the target resource permits access by the client system. At block 720, upon user logout, the target resource (or an agent resident thereon) removes the user from its resource group (e.g., remote desktop group). Advantageously, in certain embodiments, removal of the user from the resource group prevents the client system from reconnecting to the target resource without going through the broker server.

Figure 8A:
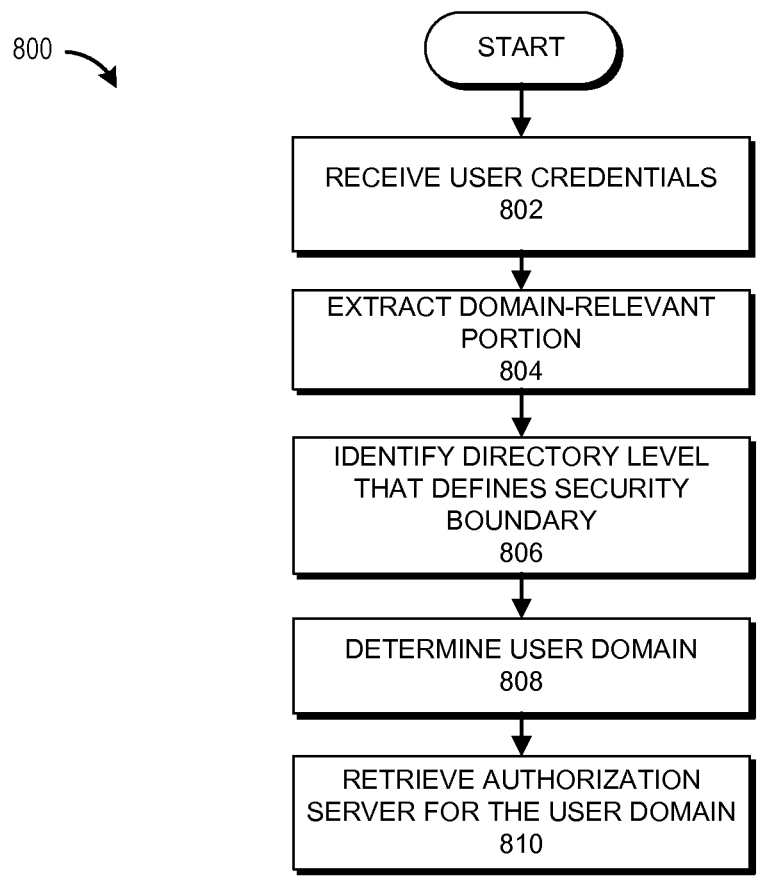
FIG. 8A illustrates an example of a process for resolving user credentials to a domain and an authentication server.

FIG. 8A presents a flowchart of an example of a process 800 for resolving user credentials to a user domain and an authentication server. For example, the process 800, in whole or in part, can be implemented by one or more of the multitenant shared-resources system 110, the multitenant shared-resources system 210, and the broker server 120. Although any number of systems, in whole or in part, can implement the process 800, to simplify discussion, the process 800 will be described in relation to specific systems or subsystems of the multitenant shared-resources system 110 or 210. For example, the process 800 can be facilitated by an authentication module such as the authentication module 124 or the authentication module 224.

At block 802, the authentication module receives credentials for a user. The credentials can include, for example, a user name and a password. The user name can be in various formats. For example, in some cases, the user name can be in a UPN-style format such as, for example, "bsmith@qafa.local." In other cases, the user name can be in a down-level logon name format such as, for example, "Philly1\bsmith." Other formats are also possible.

At block 804, a domain-relevant portion is extracted from the credentials. For example, if the user name is of the UPN-style format, the domain-relevant portion can be a UPN suffix. For instance, if the user name were "bsmith@qafa.local," the extracted UPN suffix would be "qafa.local." By way of further example, if the user name is of the down-level logon name format, the domain-relevant portion could be a substring of the user name (e.g., "Philly1" from the down-level logon name example described above).

At block 806, the authentication module identifies a highest directory level that defines an existing security boundary for the user. For example, in MICROSOFT Active Directory implementations, the existing security boundary can be defined by a forest. In some cases, the domain of the user can define the existing security boundary (e.g., in some non-Active-Directory implementations). For example, in MICROSOFT Active Directory implementations, a particular forest to which the user belongs would be identified. As described below, the highest directory level can be identified in various fashions.

In some embodiments, the highest directory level (e.g., forest) can be identified by searching domain information cache such as, for example, the domain information cache 162 or 262, for the domain-relevant portion. Using MICROSOFT Active Directory forests as an example, if the domain-relevant portion is a UPN suffix, UPN suffixes for each forest could be searched for the domain-relevant portion. When the extracted UPN suffix is found in a set of UPN suffixes for a particular forest, that forest can be identified as the forest to which the user belongs. In other embodiments, rather than searching UPN suffixes, for each forest, DNS roots of that forest's domains can be searched for a match with the domain-relevant portion. The forest that has the matching domain would be the forest to which the user belongs. In some embodiments, it can be advantageous for the authentication module to first search for UPN suffixes as described above and then search the DNS roots if the first search is unsuccessful.

If the domain-relevant portion is from a user name of a down-level logon name format, for each forest, NetBIOS names of that forest's domains can be searched for a match with the domain-relevant portion. The forest that has the matching domain would be the forest to which the user belongs. For purposes of illustration, the identified forest could be "qaforesta.local."

At block 808, a domain of the user is determined. The domain of the user can be determined in various fashions. Continuing the MICROSOFT Active Directory example from above, if the identified forest resulted from searching DNS roots or NetBIOS names, the domain of the user can be determined to be whatever domain resulted in the match. If, for example, the identified forest resulted from searching UPN suffixes, the domain of the user can be identified by searching DNS roots to determine the domain of the user. In some embodiments, the domain of the user can be determined via a catalog server such as the catalog server 170. An example of determining the domain of the user via the catalog server will be described with respect to FIG. 8B.

At block 810, an authentication server for the user's domain such as, for example, a domain controller, is retrieved from the domain information cache or a DNS server for the user's domain. The authentication server can be similar, for example, to the authentication server 140 of FIG. 1 or the authentication server 240 of FIG. 2. The authentication server can be used for authentication as described, for example, with respect to FIG. 5.

Figure 8B:
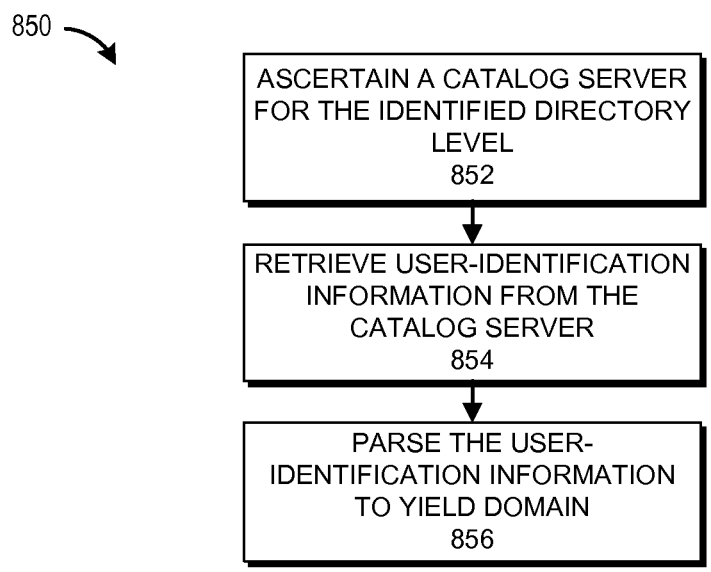
FIG. 8B illustrates an example of a process for determining a domain of a user.

FIG. 8B presents a flowchart of an example of a process 850 for determining a domain of a user. For example, the process 850, in whole or in part, can be implemented by one or more of the multitenant shared-resources system 110, the multitenant shared-resources system 210, and the broker server 120. Although any number of systems, in whole or in part, can implement the process 850, to simplify discussion, the process 850 will be described in relation to specific systems or subsystems of the multitenant shared-resources system 110 or 210. For example, the process 850 can be facilitated by an authentication module such as the authentication module 124 or the authentication module 224.

At block 852, the authentication module ascertains, using a domain information cache such as the domain information cache 162, a catalog server for the highest directory level identified, for example, at block 806 of FIG. 8A. The catalog server can be similar, for example, to the catalog server 170 of FIG. 1. As described above, the catalog server typically serves all domains of the highest directory level (e.g., forest) that defines the existing security boundary. At block 854, user-identification information is retrieved from the catalog server. The user-identification information can include, for example, the user's distinguished name, a security account manager (SAM) account name, a NetBIOS name, and/or the like.

At block 856, all or a portion of the user-identification information is parsed to yield the user's domain. For example, in MICROSOFT Active Directory embodiments, the user's distinguished name can be parsed. In these embodiments, the user's distinguished name can include a domain-controller (DC) portion that has a format such as "DC=qaforesta2, DC=local." According to this example, the user's domain can be determined to be "qaforesta2.local."

In various embodiments, systems and methods described herein can be particularly advantageous when managing shared resources that are virtual desktops. As described above, users from managed domains having independent security boundaries can be assigned and given access to virtual desktops. In certain embodiments, an administrator or MSP can use an administration module such as the administration module 164 to aggregate, across the managed domains, information about virtual desktops that are in use at a given time. In particular, certain VDC systems may provide management application programming interfaces (APIs) that can be called by administrators or by an administrative interface for purposes of returning information such as the information described above. However, such calls can be ineffective for a multitenant shared-resources system such as the multitenant shared-resources system 110 or the multitenant shared-resources system 210. This is because, as a general matter, such APIs do not accept credentials as parameters. When the multitenant shared-resources system and all managed domains are within a same security boundary (e.g., via trust relationships), credentials are not generally necessary.

For example, remote desktop services (RDS) provided by MICROSOFT may provide certain APIs such as, for example, WTSQuerySessionInformation, WTSEnumerateProcesses, WTSEnumerateSessions, and WTSOpenServer. These APIs do not natively accept credentials. However, these APIs internally call another API known as RpcBindingSetAuthInfoEx that can accept credentials. By way of example, the above-described problem of management APIs not accepting credentials can be overcome by intercepting calls to the RpcBindingSetAuthInfoEx API and inserting appropriate credentials. In this fashion, MICROSOFT management APIs can be utilized to return desired information, for example, about virtual desktops in use at a given time. In various embodiments, a similar solution can be applied with respect to any other management API that does not natively accept credentials but that, internally, makes calls to other APIs that accept credentials.

Figure 9:
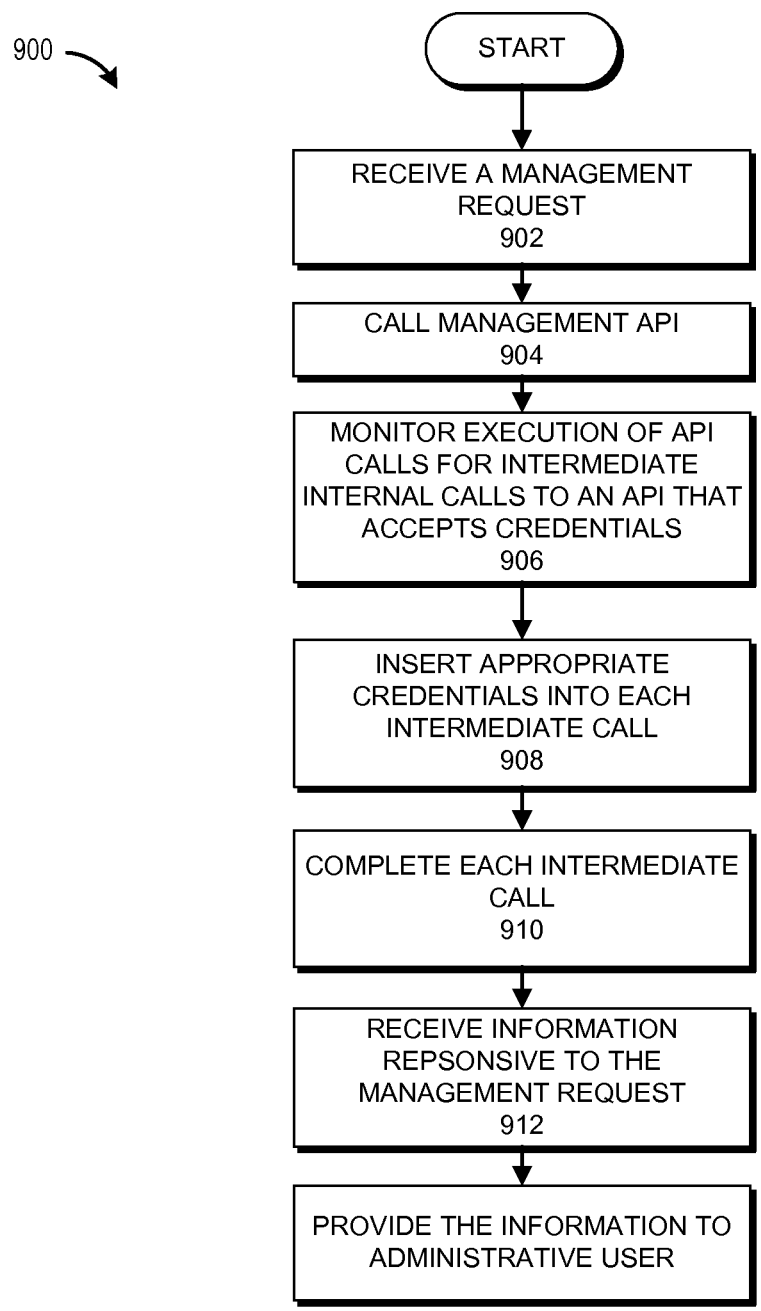
FIG. 9 illustrates an example of a process for managing virtual desktops.

FIG. 9 presents a flowchart of an example of a process 900 for managing virtual desktops. For example, the process 900, in whole or in part, can be implemented by one or more of the multitenant shared-resources system 110, the multitenant shared-resources system 210, and the broker server 120. Although any number of systems, in whole or in part, can implement the process 900, to simplify discussion, the process 900 will be described in relation to specific systems or subsystems of the multitenant shared-resources system 110 or 210. For example, the process 900 can be facilitated by an administration module such as the administration module 164 or the administration module 264.

At block 902, the administration module receives a management request from an administrative user or other user with appropriate credentials. In various embodiments, the management request can request certain information across a set of management domains such as the managed domains 168 of FIG. 1. In a typical embodiment, the request specifies one or more calls to one or more management APIs that do not accept credentials. At block 904, the administration module calls the management APIs in a standard fashion.

At block 906, the administration module or another module monitors execution of the calls to the management APIs and intercepts intermediate calls to an API that accepts credentials. The API that accepts credentials can be, for example, the RpcBindingSetAuthInfoEx API provided by MICROSOFT. At block 908, the administration module or another module inserts appropriate credentials (e.g., administrator credentials) into each intermediate call. At block 910, the administration module or another module completes each intermediate call. At block 912, the administration module receives information responsive to the management request. At block 914, the administration module provides the information to the administrative user.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising, on a multitenant shared-resources system:
   for each managed domain of a plurality of managed domains:
   collecting configuration data for the managed domain via a configuration interface provided to an authorized user;
   identifying domain-information sources for the managed domain based, at least in part, on the configuration data;
   wherein the domain-information sources comprise a catalog server and an authentication server;
   acquiring domain information for the managed domain from at least one domain-information source of the domain-information sources;
   enumerating users for the managed domain; and
   assigning at least a portion of the users to shared resources maintained by the multitenant shared-resources system; and
   wherein at least a portion of the plurality of managed domains have independent security boundaries;
   receiving a management request from an authorized user in connection with shared resources in use across the plurality of managed domains;
   monitoring calls to management application programming interfaces (APIs) that do not accept credentials;
   intercepting intermediate calls to one or more APIs that do accept credentials;
   inserting appropriate credentials into each intercepted intermediate call;
   completing each intercepted intermediate call;
   receiving information responsive to the management request; and
   providing the information to the authorized user.

2. The method of claim 1, comprising storing a result of the assigning in a data store.

3. The method of claim 1, wherein:
   the configuration data identifies at least one domain name system (DNS) server; and
   the identifying comprises:
   connecting to the at least one DNS server; and
   retrieving a list of one or more authentication servers and a list of one or more catalog servers.

4. The method of claim 1, wherein the configuration data comprises information selected from the group consisting of: a domain long name, a domain short name, a DNS server network location, credentials, and a protocol selection.

5. The method of claim 1, wherein the configuration data specifies a default protocol for communication related to the managed domain.

6. The method of claim 5, wherein the default protocol comprises Secure Lightweight Directory Access Protocol (SLDAP).

7. The method of claim 5, wherein the configuration interface allows the authorized user to deviate from the default protocol for a particular domain-information source and/or for a particular managed domain.

8. The method of claim 1, wherein at least one of the managed domains is subsumed in a higher level directory that defines an applicable security boundary.

9. The method of claim 8, wherein:
   the multitenant shared-resources system implements MICROSOFT Active Directory;
   the higher level directory comprises a forest; and
   the authentication server is a domain controller.

10. The method of claim 9, wherein the domain information comprises forest information related to the forest.

11. The method of claim 10, wherein the forest information comprises information selected from the group consisting of: flatname, a root domain naming context, a configuration naming context, and user principal name (UPN) suffixes.

12. The method of claim 10, wherein, for each domain of the forest, the forest information comprises a distinguished name for the domain.

13. The method of claim 1, wherein the shared resources comprise virtual desktops.

14. The method of claim 1, where the acquiring comprises;
   searching a connection cache for an existing connection session to the at least one domain-information source; and
   responsive to a match, using the existing connection session to connect to the at least one domain-information source.

15. The method of claim 1, comprising allowing a managed service provider (MSP) to maintain the plurality of managed domains.

16. The method of claim 1, wherein the enumerating comprises enumerating users, groups, and organizational units for the managed domains.

17. The method of claim 16, wherein the assigning comprises assigning at least a portion of the users, at least a portion of the groups, and at least a portion of the organizational units to shared resources maintained by the multitenant shared-resources system.

18. An information handling system comprising:
   at least one computer processor, wherein the at least one computer processor is operable to implement a method, the method comprising:
   for each managed domain of a plurality of managed domains:
   collecting configuration data for the managed domain via a configuration interface provided to an authorized user;
   identifying domain-information sources for the managed domain based, at least in part, on the configuration data;
   wherein the domain-information sources comprise a catalog server and an authentication server;
   acquiring domain information for the managed domain from at least one domain-information source of the domain-information sources;
   enumerating users for the managed domain; and
   assigning at least a portion of the users to shared resources maintained by the information handling system; and
   wherein at least a portion of the plurality of managed domains have independent security boundaries;
   receiving a management request from an authorized user in connection with shared resources in use across the plurality of managed domains;
   monitoring calls to management application programming interfaces (APIs) that do not accept credentials;
   intercepting intermediate calls to one or more APIs that do accept credentials;
   inserting appropriate credentials into each intercepted intermediate call;
   completing each intercepted intermediate call;
   receiving information responsive to the management request; and
   providing the information to the authorized user.

19. A computer-program product comprising a non-transitory computer-usable medium having computer-readable program code embodied therein, the computer-readable program code adapted to be executed to implement a method comprising:

for each managed domain of a plurality of managed domains:
collecting configuration data for the managed domain via a configuration interface provided to an authorized user;
identifying domain-information sources for the managed domain based, at least in part, on the configuration data;
wherein the domain-information sources comprise a catalog server and an authentication server;
acquiring domain information for the managed domain from at least one domain-information source of the domain-information sources;
enumerating users for the managed domain; and
assigning at least a portion of the users to shared resources maintained by a multitenant shared-resources system; and
wherein at least a portion of the plurality of managed domains have independent security boundaries;
receiving a management request from an authorized user in connection with shared resources in use across the plurality of managed domains;
monitoring calls to management application programming interfaces (APIs) that do not accept credentials;
intercepting intermediate calls to one or more APIs that do accept credentials;
inserting appropriate credentials into each intercepted intermediate call;
completing each intercepted intermediate call;
receiving information responsive to the management request; and
providing the information to the authorized user.

* * * * *